United States Patent [19]

Mizuno et al.

[11] 4,388,558

[45] Jun. 14, 1983

[54] DISPLAY INTENSITY CONTROL APPARATUS

[75] Inventors: Tooru Mizuno, Nagoya; Yasuo Hagisato, Toyota, both of Japan

[73] Assignees: Nippondenso Co., Ltd., Kariya; Toyota Jidosha Kogyo Kabushiki Kaisha, Toyota, both of Japan

[21] Appl. No.: 322,297

[22] Filed: Nov. 17, 1981

[30] Foreign Application Priority Data

Nov. 20, 1980 [JP]   Japan ................. 55-164367

[51] Int. Cl.³ ............................... H01K 7/00
[52] U.S. Cl. .......................... 315/77; 315/82; 315/313; 315/363
[58] Field of Search ............... 315/77, 82, 312, 313, 315/363

[56] References Cited

U.S. PATENT DOCUMENTS 4,029,991   6/1977   Schultz ................. 315/77

Primary Examiner—Harold A. Dixon
Attorney, Agent, or Firm—Cushman, Darby & Cushman

[57] ABSTRACT

A display intensity control apparatus for controlling under dark ambient conditions the display intensity of an automobile display system comprises a plurality of display units (e.g., LED, FLT, Lamp) for providing displays effected by display elements of different types. Under dark ambient conditions, a pulse signal with a predetermined duty ratio is generated at a predetermined frequency and the display intensity of selected one of the display units is decreased in accordance with the duty ratio. Simultaneously, the duty ratio of the pulse signal is changed, and the display intensities of the other display units are decreased in accordance with the changed duty ratio.

8 Claims, 5 Drawing Figures

DISPLAY INTENSITY CONTROL APPARATUS

BACKGROUND OF THE INVENTION

1. Field of the Invention

The present invention relates to display intensity control apparatus for display systems and more particularly to a control apparatus for controlling the display intensity of automobile electronic display systems under dark ambient conditions.

2. Description of the Prior Art

Recent development of display elements and electronic circuit components has led to the use of light-emitting display elements such as fluorescent display tubes (hereinafter referred to as FLT's) or light-emitting diodes (hereinafter referred to as LED's) in the various meters and clocks on automotive vehicles.

Where such light-emitting type display elements are used, the display intensity must be increased under light ambient conditions such as the daytime outdoor conditions and the display intensity must be decreased under dark ambient conditions such as the nighttime outdoor conditions. Generally, under light ambient conditions, the display elements are continuously energized to increase the display intensity (the intensity obtained by continuous energization of display elements is hereinafter referred to as a daytime intensity). Under dark ambient conditions the display elements are energized and deenergized repeatedly to flash on and off so fast that the human eye cannot perceive this fact and the duty ratio of the flashing of the display elements is varied to control the average intensity at a suitable value (the average intensity determined according to the duty ratio of the flashing is hereinafter referred to as a nighttime intensity). On the other hand, generally, in many case of automobile meters employing FLT's or LED's it is also effected to illuminate the meter dials with an incandescent lamp (hereinafter simply referred to as a lamp) and the illumination by the lamp must be controlled in harmony with the intensity of the FLT's or LED's. In this specification, a combination of a dial and a lamp is also considered as a display element. Thus, the term, display element intensity, also referes to the intensity of such lamp.

While the intensity of the FLT or LED decreases substantially in proportion to the flashing ratio (the ratio of the off-time to on-time), the intensity of the lamp varies non-linearly with the flashing ratio. Also, while the daytime intensity of the FLT is considerably high making it necessary to decrease the intensity with a high flashing ratio under dark ambient conditions, the daytime intensity of the LED is not so high that it becomes excessively dim if its intensity is decreased at the same rate with the FLT under dark ambient conditions. As a result, it is difficult to effect the desired display intensity control under dark ambient conditions of a single combination meter or of a plurality of successively arranged individual meters (e.g., a speedometer, a tachometer, a fuel gage and a thermo-gage) with a single signal source (a rheostat). However, in view of limitations in cost, difficulties in operation, etc., it is not practical to provide display intensity controlling rheostats for the FLD's, LED's and lamps, respectively, so as to adjust their intensities individually.

SUMMARY OF THE INVENTION

In view of the foregoing deficiencies in the prior art, it is an object of the present invention to provide an improved display intensity control apparatus so designed that under dark ambient conditions a pulse signal having a predetermined duty ratio is generated at a predetermined frequency to decrease the display intensity of a selected display unit in accordance with the duty ratio and also the duty ratio of the pulse signal is varied to decrease the display intensity of other display units in accordance with the varied duty ratio, thus properly controlling under dark ambient conditions the display intensity of an automobile electronic display system comprising a combination of display units which provide displays by different types of display elements such as lamps, FLT's and LED's.

DESCRIPTION OF THE PREFERRED EMBODIMENTS

The present invention will now be described in detail with reference to the illustrated embodiment.

Figure 1:
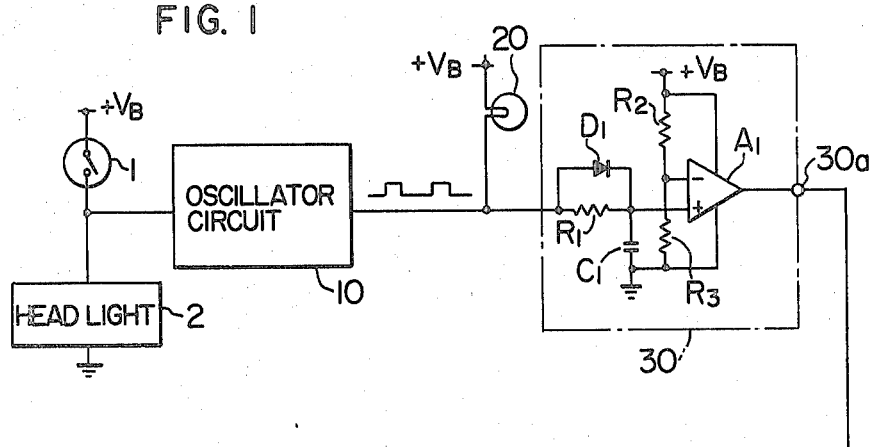
FIG. 1 is a circuit diagram showing a display intensity control apparatus according to an embodiment of the present invention.
Figure 1:
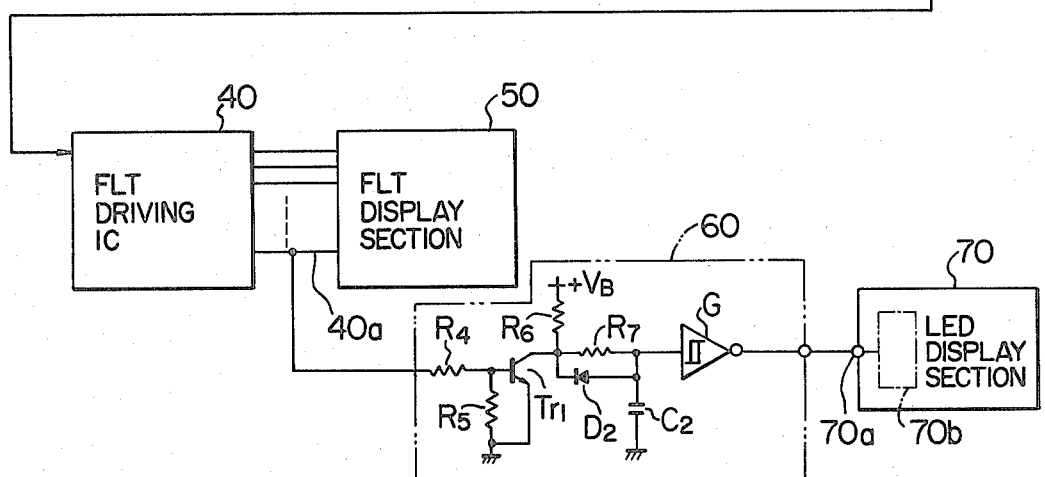

Referring to FIG. 1, numeral 1 designates a lighting switch which is closed in automobile operation under dark ambient condition to turn on illuminating head lights 2. Numeral 10 designates an oscillator circuit responsive to closing the lighting switch to generate a pulse signal of a predetermined duty ratio (the ratio of the high level to low level) at a predetermined frequency of 280 Hz and it is designed that the duty ratio (ON/OFF ratio) of its built-in oscillator can be varied by operating its variable resistor. A dial illuminating lamp 20 is directly turned on by the oscillator output waveform. Numeral 30 designates a converting circuit for generating an FLT intensity control signal. The converting circuit comprises a delay circuit including a resistor $R_1$, a diode $D_1$ and a capacitor $C_1$ and a waveform shaping circuit including resistors $R_2$ and $R_3$ and a comparator $A_1$. Numeral 40 designates an FLT driving integrated circuit (IC) responsive to the FLT intensity control signal appearing at a point 30a. In the FLT driving IC, the FLT intensity control signal, is modulated during its low level with a pulse signal having a high frequency of 20.48 kHz, for example. Numeral 50 designates an FLT-type display section designed so that selected segments of each of its display units are turned on in response to the voltages selectively applied to the output signal lines of the FLT driving IC 40. Connected to a signal line 40a from the FLT driving IC 40, on which the voltage signal is always produced, is a converting circuit 60 comprising a buffer circuit including resistors $R_4$ and $R_5$, a transistor $T_{r1}$ and a resistor $R_6$, a delay circuit including a resistor $R_7$, a diode $D_2$ and a capacitor $C_2$, and a shaping and phase-inverting gate $G_1$, and the duty ratio of the pulse signal appearing at the signal line 40a is varied to control the display intensity of an LED-type display section 70.

Figure 2:
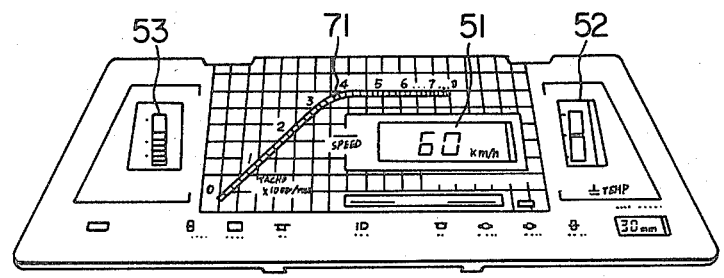
FIG. 2 is a perspective view showing by way of example an automobile display system whose display intensity is controlled by the control apparatus of FIG. 1.

FIG. 2 shows by way of example a display system comprising various automobile meters. A speedometer 51 includes a plurality of display segments for each of its display digits so that by selecting an appropriate combination of the display segments any one of the numerals "0" to "9" is digitally displayed in each display digit thus indicating the vehicle speed. This speedometer 51 comprises FLT's which emit light in blue. A thermogage 52 is a meter for indicating the temperature of the engine cooling water and a fuel gage 53 is a meter for indicating the remaining fuel level. These gages 52 and 53 are also composed of FLT's. The speedometer 51, the thermo-gate 52 and the fuel gage 53 are represented by the FLT display section 50 in FIG. 1. A tachometer 71 for indicating the engine rpm comprises a number of LED's which are arranged as shown in the Figure to give zone indications. For instance, when the engine speed is 3,000 rpm, the LED's corresponding to the graduations 0 to 3,000 are turned on. The tachometer 71 and other LED display type meters (if any) which are not shown are represented by the LED display section 70 in FIG. 1. Although not shown in FIG. 2, the dials of the thermo-gage 52, the fuel gage 53 and the tachometer 71 are illuminated by the lamp 20 shown in FIG. 1.

With the construction shown in FIG. 1, the operation of the embodiment will now be described.

Figure 3:
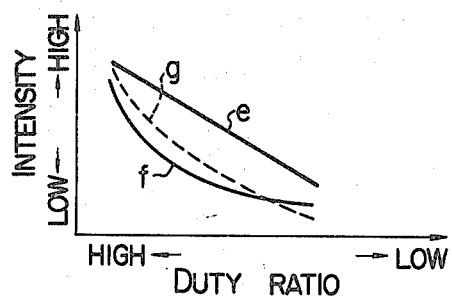
FIG. 3 is a diagram showing the intensity characteristics of display elements which are useful for explaining the operation of the control apparatus of FIG. 1.

The illuminating lamp 20 is directly operated by the pulse signal generated from the oscillator circuit 10 and the lamp 20 is turned on during the low level of the pulse signal. In this case, since the intensity of the lamp 20 is slow in its response to the driving waveform of the lamp 20, as indicated by the curve f shown in FIG. 3, the intensity of the lamp 20 varies non-linearly with the duty ratio of the pulse signal from the oscillator circuit 10. The pulse signal from the oscillator circuit 10 is applied to the positive terminal of the comparator $A_1$ via the circuit comprising the resistor $R_1$, the capacitor $C_1$ and the diode $D_1$. When the voltage of the pulse signal is at the high level, the capacitor $C_1$ is immediately charged by a current flowing through the diode $D_1$ and the positive terminal of the comparator $A_1$ immediately goes to the high level. On the other hand, when the pulse signal is at the low level, the charge on the capacitor $C_1$ is discharged via the resistor $R_1$ and consequently the transition of the positive terminal of the comparator $A_1$ to the low level is delayed.

As a result, the time during which the positive terminal voltage of the comparator $A_1$ remains at the high level is increased as compared with the waveform of the pulse signal from the oscillator circuit 10. A voltage which is about one half the high level voltage is applied to the negative terminal of the comparator $A_1$ through the resistors $R_2$ and $R_3$ thus generating at the output terminal 30a a rectangular waveform which is longer in high level time (or shorter in low level time) as shown in (b) of FIG. 4 than the output pulse signal waveform of the oscillator circuit 10 shown in (a) of FIG. 4. It is assumed that the FLT is turned on during the low level, then its ON period is decreased. Since the increment in the high level time is a fixed time determined by the resistor $R_1$ and the capacitor $C_1$, the affection of the increment increases as the duty ratio of the output pulse signal of the oscillator circuit 10 decreases, i.e. the high level time decreases, with the result that the intensity of the FLT which should vary essentially as shown by the curve e in FIG. 3 with the duty ratio of the output pulse signal of the oscillator circuit 10 is now distorted as shown by the curve g in FIG. 3 and it approaches the intensity variation characteristic of the lamp 20.

The above-described principle of the intensity control is similarly applicable to the LED.

Figure 4:
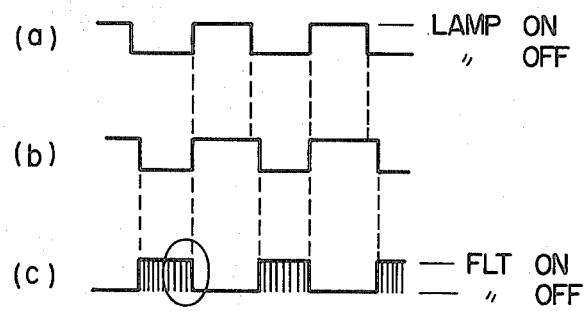
FIG. 4 shows a plurality of signal waveforms useful for explaining the operation of the control apparatus of FIG. 1.
Figure 5:
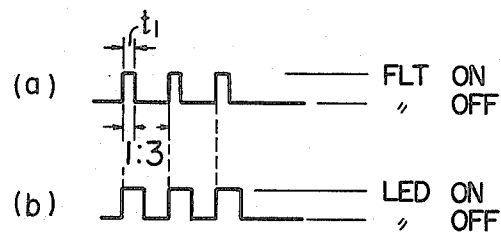
FIG. 5 shows in enlarged form the waveform of the signal shown in (c) of FIG. 4 and the waveform of the signal produced by varying the duty ratio of the former signal.

However, since the daytime intensity of the FLT is higher than that of the lamp 20, the ON period corresponding to the low level time of the pulse signal generated at the output terminal 30a of FIG. 1 is further decreased by ¼ to turn on the FLT's and thereby to accomplish the intensity control. This decrease in the ON period is effected by the previously pulse modulation of the low level period in the FLT driving IC 40. As a result, the waveform of the output signal from the FLT driving IC 40 becomes as shown in (c) of FIG. 4. The high level time in (c) of FIG. 4 represents the ON period of the FLT's. Shown in enlarged form in (a) of FIG. 5 is a part (the encircled portion) of the FLT turn-on waveform or the output signal waveform of the FLT driving IC 40 shown in (c) of FIG. 4.

If the FLT turn-on signal from the FLT driving IC 40 of FIG. 1 is used, as it is an LED turn-on signal of intensity control signal, the display by the LED's becomes excessively dim, because although the daytime intensity of the LED is higher than that of the lamp 20, it is lower than that of the FLT. To prevent such a phenomenon, the desired LED intensity control signal is obtained by increasing the time interval $t_1$ in the FLT turn-on waveform in (a) of FIG. 5. The increased time interval $t_1$ is obtained by the delay circuit of FIG. 1 comprising the resistor $R_7$, the diode $D_2$ and the capacitor $C_2$ and a desired LED intensity control signal is generated as shown in (b) of FIG. 5 via the shaping and phase-inverting gate $G_1$. The LED's are turned on during the high level time of the control signal. The ON period of the LED's or the pulse width of the intensity control signal shown in (b) of FIG. 5 is determined by the capacitor $C_2$ and the resistor $R_7$, and hence, by suitably selecting their values, a desired nighttime intensity of the LED's can be determined in agreement with the nighttime intensity of the FLT's.

If the LED display section 70 includes a lighting circuit 70b having a function of turning on the LED's only for a suitable interval during the low level time of the signal generated at the output terminal 30a of FIG. 1, the converting circuit 60 is not needed and it is only necessary to apply the signal from the output terminal 30a as it is to an input terminal 70a of the LED lighting circuit.

The intensity obtained by continuously energizing the FLT's or the daytime intensity represents an intensity obtained in case where the pulse-modulated high level periods of the control signals shown in (c) of FIG. 4 does not include the interval correspond to the high level time of the waveform shown in (b) of FIG. 4. From FIG. 1, it will readily be seen that the control signals with such continuous high level periods can be produced when the oscillator circuit 10 is not in operation. The same is applicable to the daytime intensity of the LED's.

It will thus be seen from the foregoing that in accordance with the above-described embodiment the display intensities of different types of display elements are suitably controlled in accordance with their respective intensity characteristics under dark ambient conditions and the nighttime display intensities of the display units where displays are made by these display elements are obtained in harmony with each other on the whole of the display system, thus providing suitable automobile electronic displays under dark ambient conditions.

We claim:

1. A display intensity control apparatus for a display system of an automobile including a plurality of display units having display means of different types, respectively, said apparatus comprising:
   switch means adapted to be turned on under dark ambient conditions;
   pulse generating means responsive to turning on of said switch means to generate a first pulse signal with a predetermined duty ratio at a predetermined frequency for controlling an average intensity of a first one of said display means in accordance with said duty ratio; and
   duty ratio converting means for changing said duty ratio of said first pulse signal to generate a second pulse signal having the changed duty ratio for controlling an average intensity of a second one of said display means in accordance with said changed duty ratio.

2. An apparatus according to claim 1, wherein said duty ratio converting means includes means for increasing a high level time of said first pulse signal with decreasing a low level time of said first pulse signal.

3. An apparatus according to claim 2, further comprising driving means responsive to said second pulse signal to produce a third pulse signal including a plurality of pulses having a relatively small pulse width during a low level time of said second pulse signal to control the average intensity of said second display means.

4. An apparatus according to claim 3, further comprising another duty ratio converting means for changing the pulse width of the pulses of said third pulse signal to change the duty ratio thereof, thereby generating a fourth pulse signal including a plurality of pulses having said changed pulse width for controlling an average intensity of said third display means.

5. An apparatus according to claim 4, wherein the last said converting means includes means for increasing the pulse width of the pulses of said third pulse signal.

6. An apparatus according to any one of claims 1 to 5, wherein said switch means includes a lighting switch for turning on head lights of said automobile.

7. An apparatus according to claim 1, 2 or 3, further comprising a lighting circuit connected to said duty ratio converting means, for turning on said third display means for a predetermined period during said low level time of said second pulse signal to control the average intensity of said third display means.

8. A display intensity control apparatus for a display system of an automobile including a plurality of display units having display means of different types, respectively, said apparatus comprising:
   switch means adapted to be turned on under dark ambient conditions;
   pulse generating means responsive to turning on of said switch means to generate a first pulse signal with a predetermined duty ratio at a predetermined frequency;
   a first duty ratio converting means for increasing a high level time of said first pulse signal with decreasing a low level time of said first pulse signal to change the duty ratio thereof to generate a second pulse signal having said changed duty ratio;
   modulating means responsive to said second pulse signal to generate a third pulse signal including a plurality of pulses having a relatively small pulse width during a low level time of said second pulse signal; and
   second duty ratio converting means for increasing the pulse width of the pulses of said third pulse signal to change the duty ratio thereof, thereby generating a fourth pulse signal having said changed duty ratio;
   thereby controlling an average intensity of a first one of said display means in accordance with said first pulse signal, controlling an average intensity of a second one of said display means, higher in daytime intensity than said first display means, in accordance with said third pulse signal, and controlling an average intensity of a third one of said display means, higher than said first display means but lower than said second display means in daytime intensity, in accordance with said fourth pulse signal.

* * * * *